United States Patent [19]

Rossi

[11] 4,065,784

[45] Dec. 27, 1977

[54] METHOD AND APPARATUS FOR PCM-ENCODING NTSC COLOR TELEVISION AT SUB-NYQUIST RATE

[75] Inventor: John P. Rossi, New York, N.Y.

[73] Assignee: CBS Inc., New York, N.Y.

[21] Appl. No.: 727,819

[22] Filed: Sept. 29, 1976

[51] Int. Cl.$^2$ .............................................. H04N 9/32
[52] U.S. Cl. ...................................................... 358/13
[58] Field of Search ........................................... 358/13

[56] References Cited

U.S. PATENT DOCUMENTS 3,858,240  12/1974  Golding et al. ......................... 358/13

Primary Examiner—John C. Martin
Assistant Examiner—Aristotelis M. Psitos
Attorney, Agent, or Firm—Spencer E. Olson

[57] ABSTRACT

NTSC television signals are digitally encoded at sub-Nyquist rates by placing the alias components into those parts of the spectrum not normally occupied by the luminance or chrominance components of the video signal. In a system described, the sampling frequency, $f_s$, is exactly $2f_{sc} + \frac{1}{4}f_h$ or $2f_{sc} - \frac{1}{4}f_h$, where $f_{sc}$ is the NTSC color subcarrier frequency and $f_h$ is the line-scan frequency. Most of the alias signals in the thus encoded signal are removed from the baseband video by comb filtering between $f_s - f_y$ and $f_s$, where $f_y$ is the baseband video bandwidth.

9 Claims, 13 Drawing Figures

METHOD AND APPARATUS FOR PCM-ENCODING NTSC COLOR TELEVISION AT SUB-NYQUIST RATE

BACKGROUND OF THE INVENTION

This invention relates generally to television apparatus, and more particularly to a method and apparatus for digitally encoding an NTSC color television signal.

Where a transmission channel has a limited data rate or a digital store has a limited capacity, it sometimes becomes necessary to reduce the data rate of pulse-code-modulated (PCM) color television signals. One direct way of doing this is to lower the encoding frequency, $f_s$. However, the Nyquist sampling limit is reached when $f_s = 2f_v$, where $f_v$ is the highest video frequency being encoded. Reducing $f_s$ further causes beating distortions due to the lower sidebands of $f_s$ overlapping the baseband video frequencies. For NTSC television, $f_v = 4.2$ MHz and the Nyquist sampling limit is 8.4 MHz.

With a monochrome video signal, if $f_s$ is chosen to be an odd integral multiple of one-half the line scan frequency, $f_h$, it is possible to remove most of the aliasing distortion by comb filtering after the codec; a system for doing this is described in an article by L. S. Golding entitled, "A Digital Communications System for Satellite Links", *Proceedings of Second International Conference on Digital Satellite Communications*, Paris, November 1972. This is true because the alias components are largely confined to bursts of energy centered on $(n + \frac{1}{2})f_h$, where $n$ is an integer, and the luminance component (Y) of the video signal is confined to bursts centered on $nf_h$. Only those frequencies lying between $f_s - f_v$ and $f_v$ need be comb filtered.

The unique characteristics of PAL color television signals permit their being encoded at sub-Nyquist rates and comb filtered to remove aliasing, in the manner described by V. G. Devereux and G. J. Philips in an article entitled, "Bit-Rate Reduction of Digital Video Signals Using Differential PCM Techniques", pp. 83–89, *IEEE Conference Publication No. 119*. This is possible due to the chrominance (C) signal energy being centered on bursts of frequencies at $(n+\frac{1}{4})f_h$. When the PAL signal is encoded at a sub-Nyquist frequency equal to an odd integral multiple of $\frac{1}{2}f_h$, the Y alias components are restricted to frequencies centered on $(n+\frac{1}{2})f_h$, which can then be placed in the nulls of the comb filter for removal.

NTSC television signals could also be digitally encoded at sub-Nyquist rates if means were available to place the alias components into those parts of the spectrum not occupied by Y or C components of the video signal. It would then be possible, by suitable comb filtering, to remove most of the alias signals from the baseband video. It is a primary object of the present invention to provide a method and apparatus for satisfying this need, thereby to reduce the data rate of PCM-encoded NTSC television signals.

SUMMARY OF THE INVENTION

Briefly, the data rate of PCM-encoded NTSC television is accomplished by encoding at sub-Nyquist rates by using a sampling frequency, $f_s$, that is exactly $2f_{sc}+\frac{1}{2}h$ or $2f_{sc}-\frac{1}{2}h$, where $f_{sc}$ is the NTSC color subcarrier frequency and $f_h$ is the line-scan frequency, thereby to place the alias components into those parts of the spectrum not normally occupied by the luminance or chrominance components of the video signal. This allows most of the alias signals in the encoded signal to be removed from the baseband video by comb filtering between $f_s-f_v$ and $f_v$, where $f_v$ is the baseband video bandwidth.

Specific features of the invention, and the construction and operation of apparatus in which it is embodied, will be described in conjunction with the accompany drawings.

DESCRIPTION OF THE PREFERRED EMBODIMENT

Figure 1:
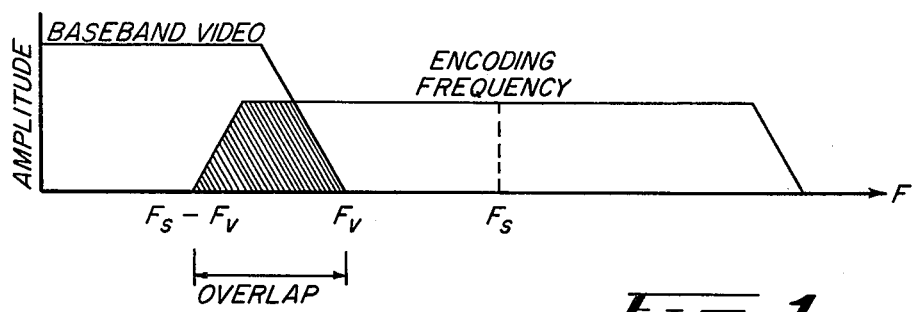
FIG. 1 is a diagram showing the foldover of the lower encoded video sideband onto the baseband video when $f_s$ is less than $2f_v$.

When it is attempted to reduce the encoding frequency, $f_s$, in the PCM-encoding of NTSC television signals below the Nyquist limit where $f_s=2f_v$, where $f_v$ is the highest video frequency being encoded, beating or "aliasing" distortion occurs due to the lower sidebands of $f_s$ overlapping the baseband video signals, as shown in FIG. 1. (The set of different possible signals with the same set of sample values are called "aliases" or "alias components" of the band limited signal.) For NTSC television, $f_v = 4.2$MHz and the Nyquist sampling limit is 8.4MHz.

Figure 2:
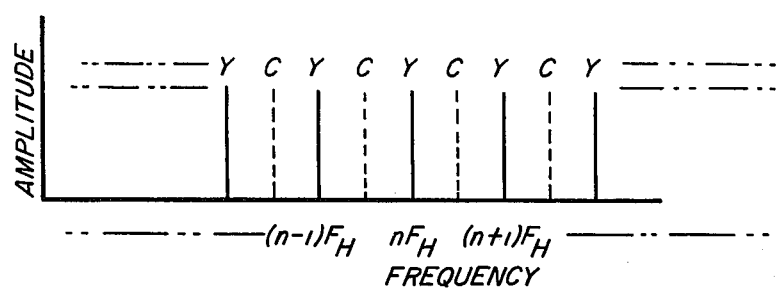
FIG. 2 is a diagram showing the spectral characteristic of the main Y and C energy components of an NTSC color television signal within the chrominance sideband.

Before proceeding to the description of the sub-Nyquist encoding system of the invention, it will be useful to review the significant spectral characteristics of the NTSC color television signal. The spectral energy of the luminance (Y) signal is essentially centered at harmonics of the line scanning frequency $f_h$, i.e., $nf_h$, where $n +$ integer. The chrominance (C) signal spectral energy peaks at odd harmonics of $\frac{1}{2}f_h$, i.e., $(n + \frac{1}{2})f_h$. Thus, the Y and the C energy bundles are frequency interleaved as shown in FIG. 2.

To encode the PCM NTSC color television signal at sub-Nyquist rates and be able to later remove the alias components, it is necessary to choose an encoding frequency $f_s$ that frequency interlaces the alias components between the desired Y and C components. This interlacing is accomplished in the system to be described by making $f_s = (n + \frac{1}{2})f_h$ (or alternatively, $(n - \frac{1}{2})f_h$.

In addition, as the chrominance signal from approximately 3MHz to 4.2MHz is a double sideband modulated signal centered at $f_{sc}$ (approximately 3.58MHz), alias components likewise symmetrical to $f_{sc}$ would cause the least color difference signal crosstalk by affecting the chrominance sidebands equally. This suggests that $f_s$ should be equal or nearly equal to $2f_{sc}$. Combining these requirements has led to the conclusion by applicant that satisfactory sub-Nyquist encode rates would be $2f_{sc} + \frac{1}{2}f_h$ or $2f_{sc} - \frac{1}{2}f_h$, where $f_{sc}$ is $455/2f_h$.

Figure 3:
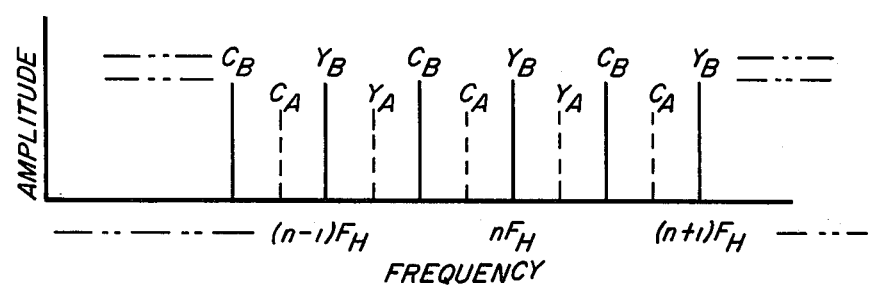
FIG. 3 is a diagram showing main spectral lines of the baseband luminance and chrominance signals and the alias signals for an encode rate of $2f_{sc} + f_n$.

Encoding at $2f_{sc} + \frac{1}{2}f_h$ results in the frequency spectrum shown in FIG. 3, wherein are shown the peak frequency components of the baseband luminance $Y_B$ and chrominance $C_B$, and the alias luminance components $Y_A$ and chrominance components $C_A$. Unless the alias components can be acceptably removed, obviously the utilization of the aforementioned sub-Nyquist encode rates would not serve the intended purpose of satisfactorily reducing the data rate of PCM television signals.

Another feature of the invention is applicant's recognition that most of the alias signals can be repeated by means of suitable transversal comb filtering. As will be seen in FIG. 3, the centers of the alias energy bursts are separated by frequency intervals of $\frac{1}{2}f_h$; thus, in order to reject the alias signals, the comb filter should have its maximum responses (teeth) or minimum responses (nulls), at frequency intervals of $\frac{1}{2}f_h$. Such a comb filter can be made by combining video signals from alternate time-sequential television lines. For example, in a particular field, a given line $l$ would be combined with line $(l-2)$ or line $(l+2)$. Since a transversal filter that combines television lines can cause objectionable transients and a loss of vertical resolution in the television picture, it is desirable to combine as few lines as possible to obtain the necessary comb filter frequency response.

Figure 4:
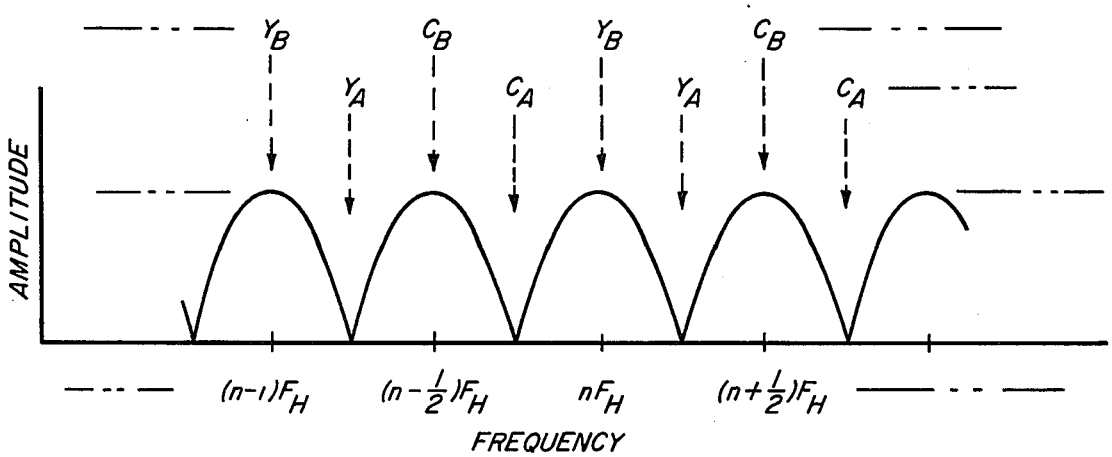
FIG. 4 is a diagram showing the frequency response characteristic of one form of comb filter.
Figure 5:
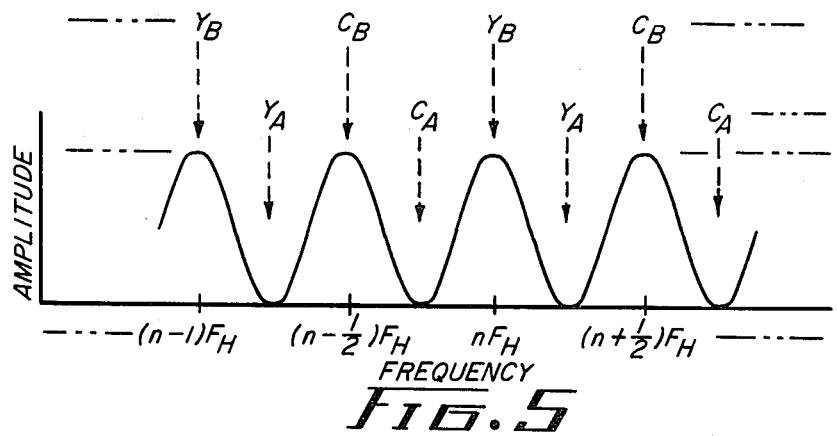
FIG. 5 is a diagram showing the frequency response of another form of comb filter.

The alias signal can be removed from a sub-Nyquist encoded NTSC color television signal by using either of the following comb filter algorithms:

1. Add television line $l$ to $(l-2)$ line
2. Add television line $l$ to $(l+2)$
3. Add television line $l$ to $\frac{1}{2}[(l-2) + (l+2)]$ with lines from a single field to avoid the need for interfield storage in the decoder. It will be noted that algorithms (1) and (2) combine two television lines, and that algorithm (3) combines three lines. The frequency response of a comb filter utilizing either of algorithms (1) or (2) is shown in FIG. 4, and the frequency response of a comb filter using algorithm (3) is shown in FIG. 5. In all cases the comb filters have nulls at the alias peak amplitude frequency components, and the teeth are centered at the peak amplitude frequency components of the baseband signal.

Figure 6:
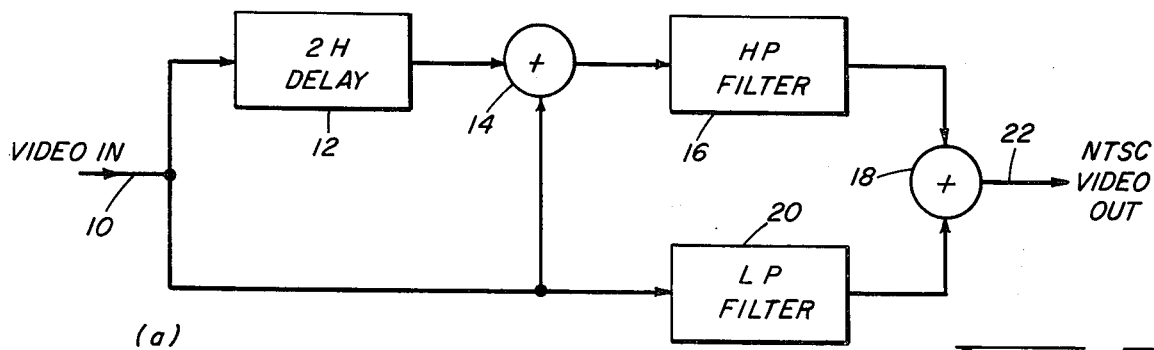
FIGS. 6, 7 and 8 are block diagrams of three possible comb filters useful in the practice of the invention.
Figure 7:
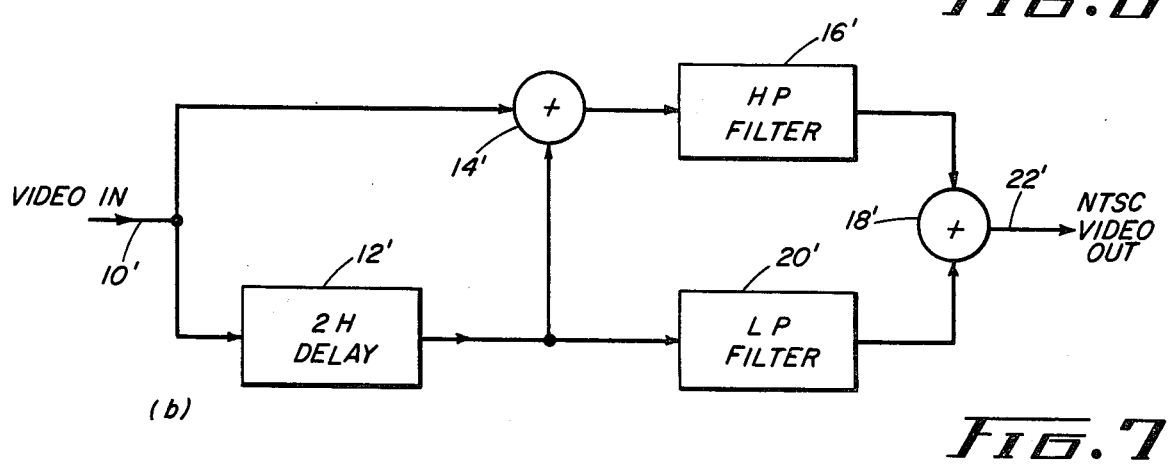

FIGS. 6 and 7 show in block diagram form two different versions of a comb filter that utilizes algorithms (1) or (2). In the system of FIG. 6, the present input video signal ($l$) at the input 10 is added in a suitable summing circuit 14 to the input signal delayed by a delay device 12 by exactly twice the line scan period (2H). The sum signal is transmitted through a high-pass filter 16 having a pass band between $f_s - f_v$ and $f_n$, and the filtered signal is added in a summing circuit 18 to the present signal after filtering by a low pass filter 20 having a cutoff frequency of $f_s - f_v$ to produce the NTSC video signal at an output terminal 22.

The system of FIG. 7 contains the same elements as the system of FIG. 6, but are differently connected; corresponding elements are identified by the reference numerals used in FIG. 6 except that they are primed. In this embodiment, the low frequencies appearing at the output terminal 22' are delayed by two scan lines, whereas in the FIG. 6 system the low frequencies are undelayed.

Each of the described comb filters has an output for frequencies between $f_s - f_v$ that is equal to the sum of the present input signal and the input signal delayed by exactly twice the line-scan period (2H). For frequencies below $f_s - f_v$, the output of the FIG. 6 filter is equal to the input signal, and the output of the FIG. 7 filter is equal to the input signal delayed by 2H.

Figure 8:
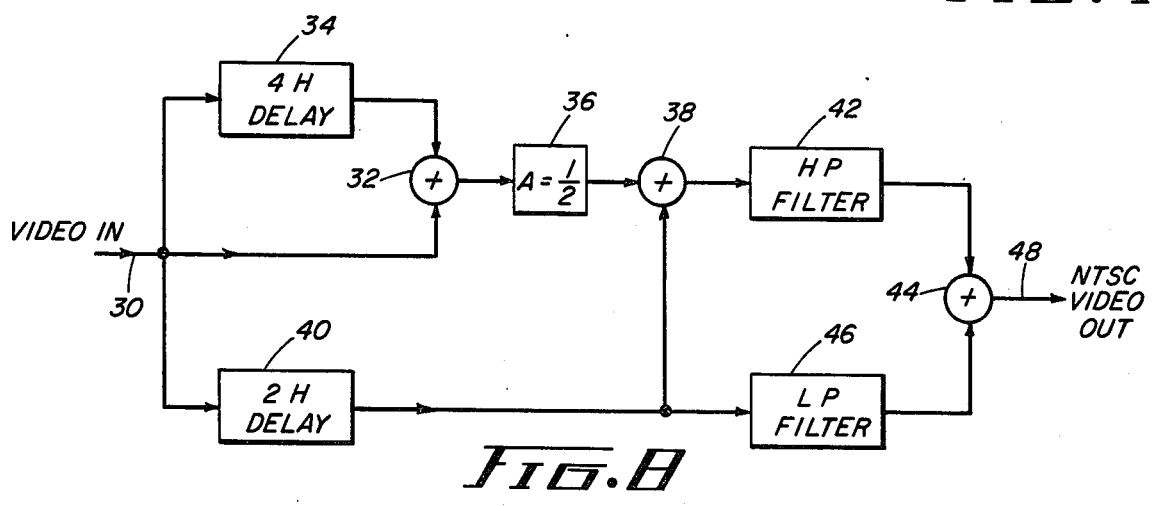

In the comb filter of FIG. 8, which utilizes three television lines, the present line $l$ at input terminal 30 is combined in a summing circuit 32 with the input signal delayed by exactly 4H by a delay device 34. The amplitude of the sum signal from the summing circuit is reduced by one-half by a suitable attenuating device 36 and combined in a second summing circuit 38 with the input signal delayed by exactly 2H by a delay device 40. The sum signal from summing circuit is transmitted through a high pass filter 42 and combined in a summing circuit 44 with the 2H-delayed signal after filtering by a low pass filter 46. Thus, this filter has an output signal on output line 48 for frequencies between $f_s - f_n$ and $f_v$ that is equal to the sum of one-half the input signal plus the input signal delayed by exactly 2H plus one-half the input signal delayed by exactly 4H. For frequencies below $f_s - f_v$, the output of the filter is equal to the input signal delayed by 2H.

Inasmuch as the described comb filters will exhibit a rise in response within the frequency band of the comb filter, it is desirable to introduce a complementary equalizer into the system.

Figure 9:
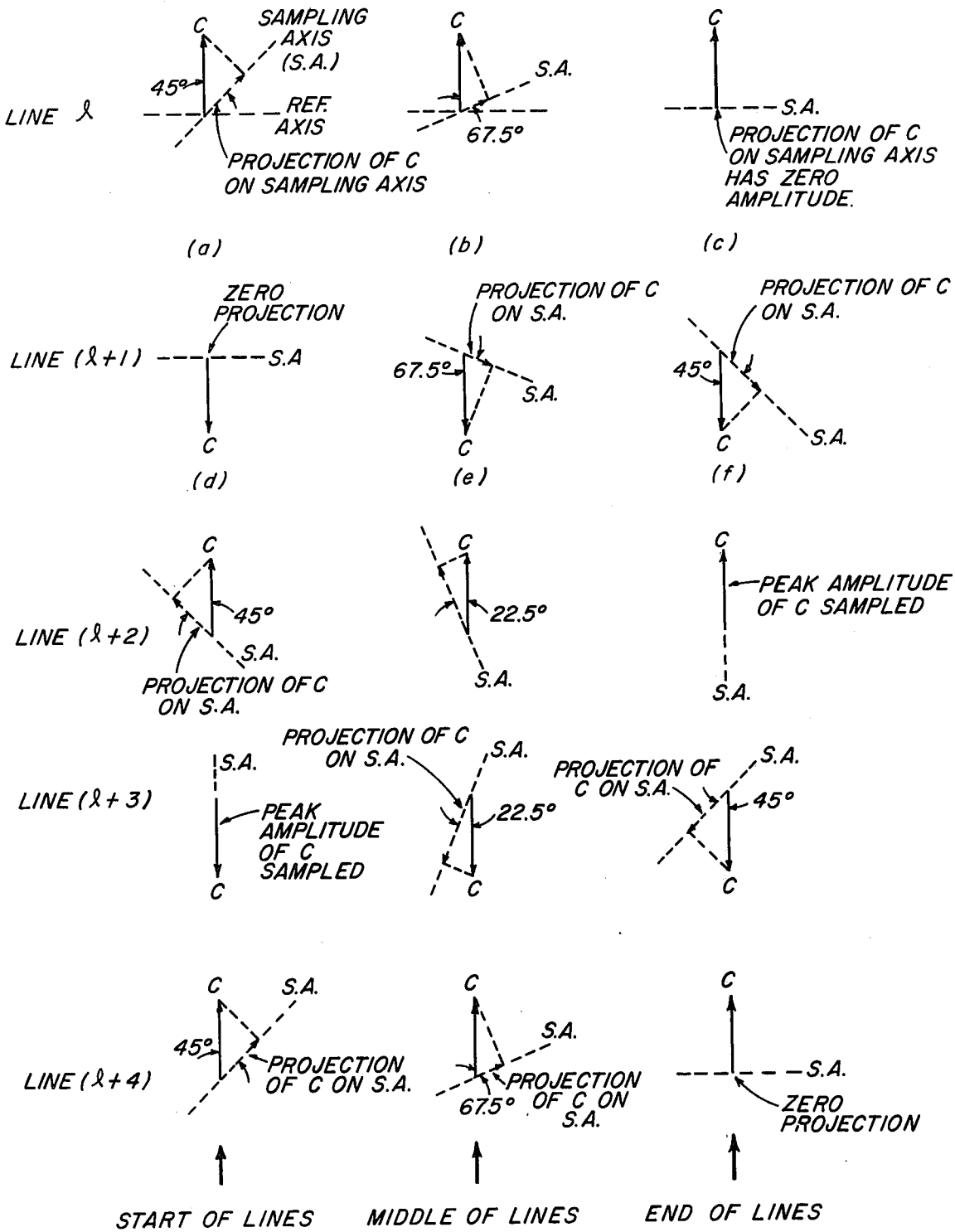
FIG. 9 is a set of phasor diagrams depicting the effect of sub-Nyquist encoding on the television signal.

The effects of the described sub-Nyquist encoding on the television signal will be better understood from examination of the signals in the time domain through the use of phasor diagrams of FIG. 9. Assume that the television signal represents a solid color field with constant Y and C signals, and the C signal is represented by a constant amplitude phasor, and choose a two-dimensional array of picture points that are vertically aligned on five adjacent sequential television lines, $l$ to $(l+4)$. Each line of the array consists of three equidistant points approximately one-third of a television line apart, such that the C phasor has the same phase at these points. Due to the selected points being in vertical alignment, the C phasor will be in opposite phase on adjacent lines.

Since the television signal is being sampled at $f_s + (2f_{sc} - \frac{1}{2}f_h)$, it will be seen in FIG. 9 that the $-\frac{1}{2}f_h$ factor will cause the C signal to be sampled at an angle that smoothly changes 45° across each line. At the beginning of line $l$, phasor C is 90° from the subcarrier reference, and the sampling axis is arbitrarily placed at 45° from the reference. The resultant sampled signal is the projection of C on the sampling axis (FIG. 9a). Near the center of that television line, the sampling axis is at 67.5° from C (FIG. 9b) resulting in the projection Ccos67.5° on the sampling axis. By the end of the line, the sampling axis is in phase with the reference, resulting in zero projection of C on this axis (FIG. 9c).

At the beginning of line $(l+1)$, the sampling axis is still on the reference. By the end of $(l+1)$, the sampling axis will be at $-45°$ from the reference (FIG. 9f). This continues in the same manner where for every television line the sampling axis undergoes a 45° phase shift with respect to a fixed color subcarrier reference.

It will now be apparent by looking at the sampling axes for different television lines and at different points along each line that the original C signal can be regenerated by adding sampled chrominance components separated by exactly two television lines. It should also be clear that one can also add $(l+2)$ to $\frac{1}{2}[l + (l+4)]$ to obtain the C signal. In fact, as the chrominance sampling axes separated by two television lines are in quadrature, it is possible to regenerate the original chrominance by adding its quadrature components.

In the decoder of the system utilizing the described encoding method, the sampled C signal is reconstructed after the digital-to-analog converter by a conventional boxcar hold circuit, whose output is a square wave with a peak amplitude determined by the projection of the chrominance of the sampling axis. Then, by passing the square wave through a low-pass filter, the fundamental sinusoidal component, having an amplitude $4/\pi$ times the peak amplitude of the square wave, is recovered. This can be compensated by lowering the C signal by a factor of $\pi/4$ in order to scale it to its original amplitude.

Sub-Nyquist encoding of a PCM NTSC color television signal in the described system is achieved with $f_s = 2f_{sc} + \frac{1}{2}f_h$, (or $2f_{sc} - \frac{1}{2}f_h$). With $f_s$ close to, but not equal to, $2f_{sc}$ all signal processing must be performed with extreme accuracy in order to avoid generating extraneous color beats. In particular, it can be seen from FIG. 9 that when a comb filter, of the kinds described, is used to remove the alias signal, complementary quadrature components of the original chrominance are added every other line. For example, if a constant chrominance signal is sampled at $+45°$ on line $l$, it will be sampled at $-45°$ $(l+2)$, at 0° on $(l+1)$ and 90° on $(l+3)$. Then, if the processing system introduces any differential phase and gain error, which is inevitable with quantizing errors in the analog-to-digital converter, the resultant reconstructed NTSC color signal will exhibit noticeable hue and saturation changes on alternate lines.

Figure 11:
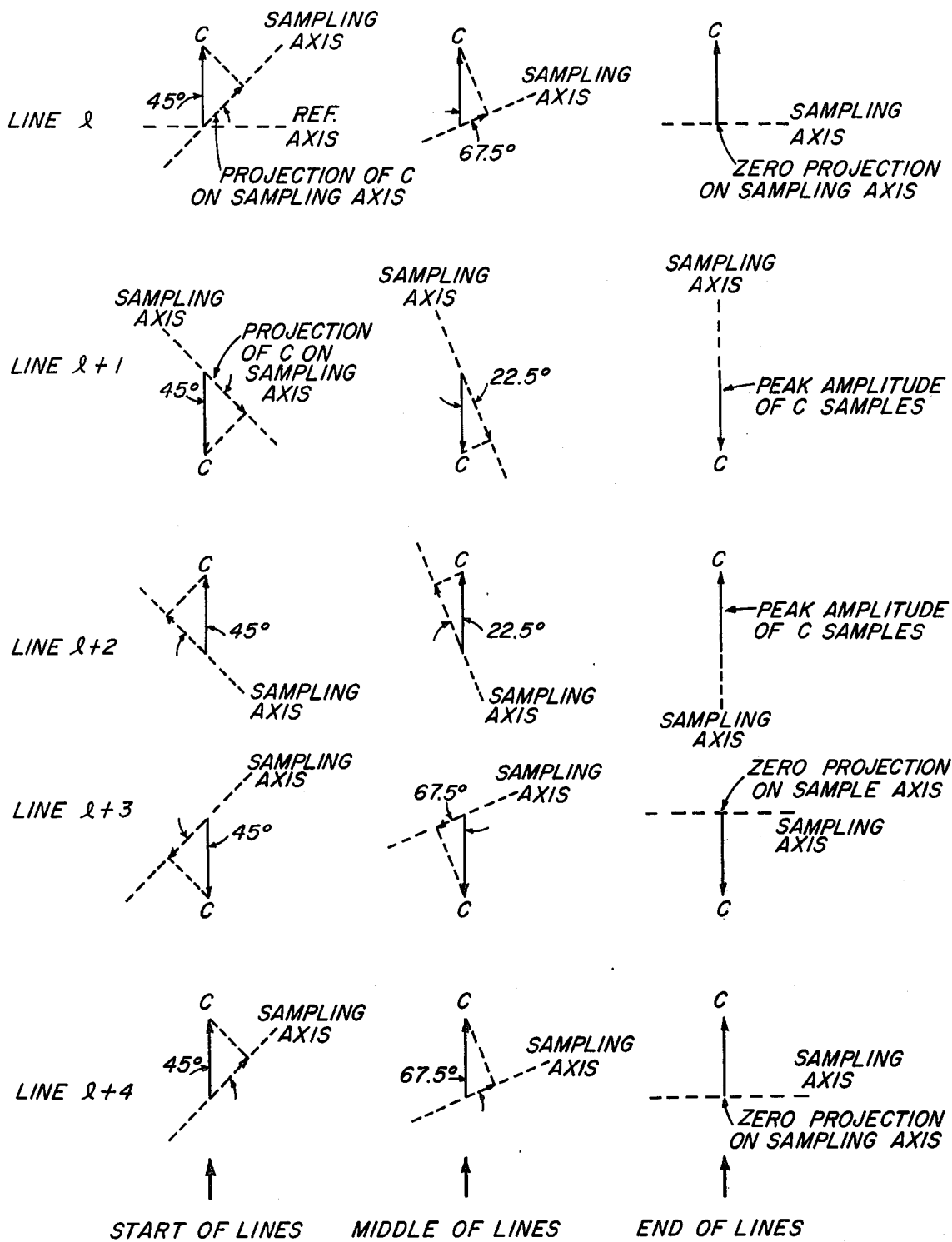
FIG. 11 is a set of phasor diagrams useful to the understanding of the operation of the encoder of FIG. 10.

A partial solution to this problem is constant vertical quadrature phase encoding. It involves shifting the phase of $f_s$ by 90° on alternate television lines, which results in a 45° phase shift in the sampling axis with respect to the color subcarrier. Upon comb filtering, the vertically aligned chrominance signal on every line is reconstructed using exactly the same quadrature components. FIG. 11 shows the relationship between a constant chrominance signal and its sampling axes on adjacent lines when constant vertical quadrature phase sampling is used. Comparison of this set of phasor diagrams with those of FIG. 9 will show the effect of shifting the encoding phase. An encoder for achieving constant vertical quadrature phase encoding will be described presently, following a brief discussion of precautions to be observed as regards the NTSC signal to be applied to the encoder.

The input NTSC color television baseband signal spectrum should be free of energy components at frequencies $(n + \frac{1}{2})f_h$, at which frequencies the alias energy will be concentrated. This is especially true within the range of frequencies from $f_s - f_v$ to $f_v$. Otherwise, the alias components generated by encoding at $f_s = (2f_{sc} + \frac{1}{2}f_h)$ will overlap the baseband video signal and will be inseparable. This can be avoided by comb filtering the NTSC color signal prior to encoding to remove any $(n + \frac{1}{2})f_h$ energy components.

The use of pre-encoding comb filtering, however, results in an additional loss of vertical resolution, particularly on colored horizontal boundaries and diagonal boundaries in the luminance image. And if a three-line comb filter, as shown in FIG. 8, is used both pre- and post-encoding, the resultant signal on line $l$ will contain a weighted average of high frequency information from lines $(l\pm2)$ and $(l\pm4)$. This will cause a marked reduction in the vertical resolution of image components that are subjected to comb filtering. The alternative is to use the two-line comb filters shown in FIGS. 6 or 7, using the comb filter of FIG. 6 for pre-encoding and the comb filter of FIG. 7 after decoding, or vice versa.

Transversal comb filters are known to cause some objectionable transients, the most disturbing of which is the generation of one or two extra lines of chrominance at sharp vertical color transitions. Using the described sub-Nyquist encoding system, those chrominance transients generated by the comb filters would have a 7.5Hz flicker rate. Such flicker can be removed by using the adaptive comb filter described in applicant's copending application Ser. No. 705,204, filed July 14, 1976, that can detect color transients and automatically switch off the comb filter.

Figure 10:
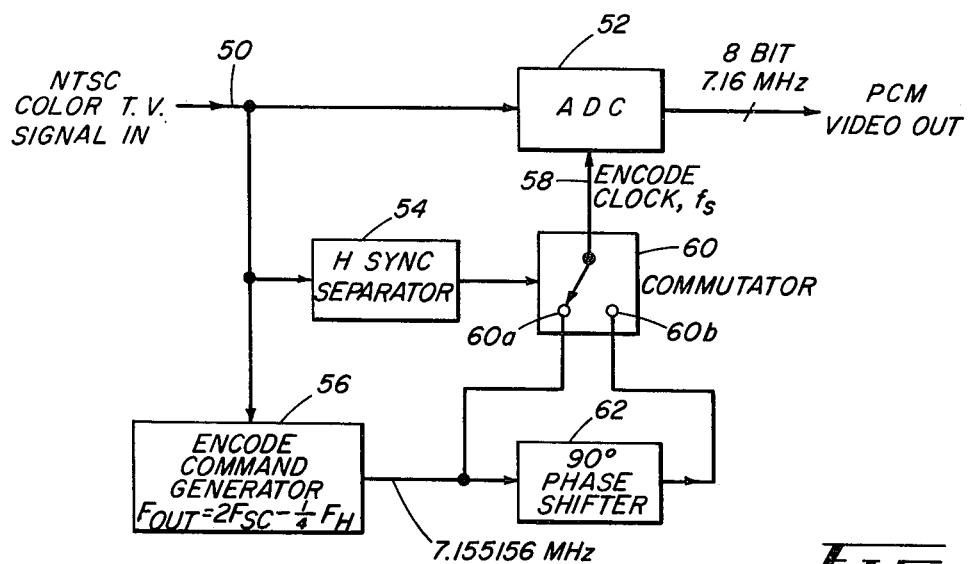
FIG. 10 is a block diagram of an encoding system employing sub-Nyquist sampling according to the invention.

FIG. 10 shows in block diagram form a system for PCM-encoding a NTSC color television signal at the sub-Nyquist rate discussed earlier. An input NTSC video signal in analog form, which has preferably been subjected to comb filtering for the reasons, and in the manner, discussed above, is received on a line 50 and coupled to the input of an analog-to-digital converter 52, to a horizontal sync separator 54 and to an encode command generator 56. The ADC, which in the present embodiment, is a PCM modulator, samples the analog video signal under control of a sampling signal, or encode clock, on line 58, which is the output of a commutator or switch 60, schematically shown as a single-pole double throw switch having input terminals 60a and 60b and then converts the sampled television signal into digital form. The sampling signal generated by encode command generator 56 is coupled to terminal 60a, and after being shifted in phase by 90° by a phase-shifter 62, is coupled to terminal 60b of the switch. These two sampling signals (of the same frequency but differing in phase by 90°) are alternately utilized as sampling signals for successive horizontal lines of the television field to provide the constant vertical quadrature phase encoding described above. This is achieved by using the horizontal sync signal, obtained by sync separator 54, to control the switch 60.

As discussed above, the frequency $f_s$ of the sampling signal may be either $(2f_{sc} + \frac{1}{2}f_h)$ or $(2f_{sc} - \frac{1}{2}f_h)$; in the NTSC system of television $2f_{sc} = 7159090$Hz and $\frac{1}{2}f_h = 3934$Hz, so that $f_s$ may be 7163024Hz or 7155156Hz. For purposes of illustration, the encode command generator 56 produces a sampling signal of the latter frequency. Whichever $f_s$ is used, it is essential for the reasons discussed earlier, that harmonics of $\frac{1}{2}f_h$ be kept out of $f_s$. It has been found that the PCM encoding frequency $f_s$ is not critical; it can be as much as 50 or 100Hz off lock and still not produce objectionable color beats.

Figure 12:
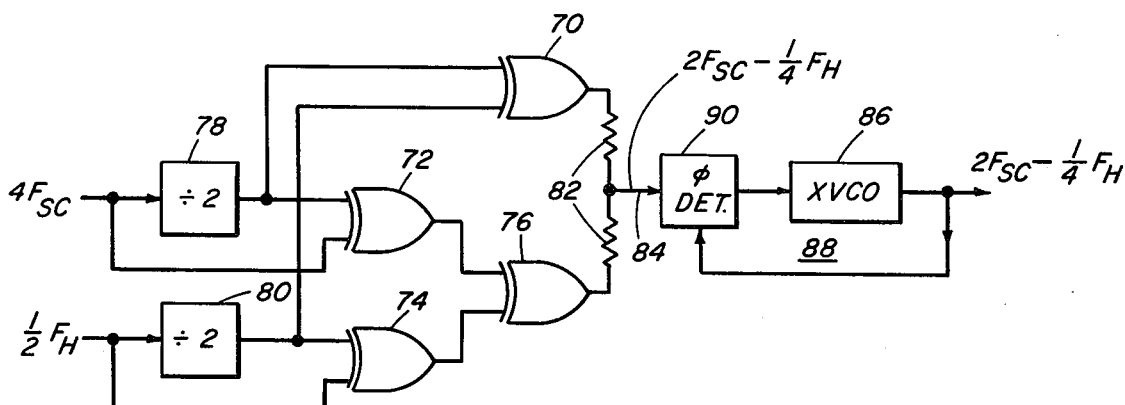
FIG. 12 is a block diagram of one system for generating sampling signals for use in the system of FIG. 10.
Figure 13:
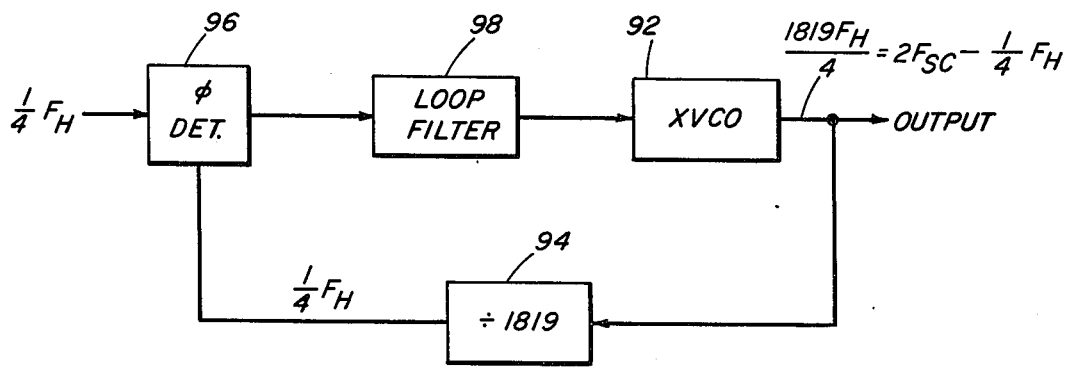
FIG. 13 is a block diagram of an alternative system for generating sampling signals for use in the system of FIG. 10.

The encode command generator 56 may take a variety of forms, two different circuits for generating $f_s$ being shown in FIGS. 12 and 13. The circuit of FIG. 12 utilizes a digital single-sideband mixer of the type described by Counselman and Hinteregger in an article entitled, "Digital Single-Sideband Mixer" appearing at pp. 478–479 of *Proceedings of IEEE*, April 1973, in which only "digital" logic devices and no reactive or frequency-selective "analog" circuit elements are used. Exclusive-or logic gates 70, 72, 74 and 76 act as the mixers in the digital circuit. Two signals of frequencies $4f_{sc}$ and $\frac{1}{2}f_h$ derived elsewhere in the system are applied to frequency divider circuits 78 and 80, respectively, in which the input signal frequency is divided by two. The signals at the outputs of dividers 78 and 80 are applied to the input terminals of exclusive-or gate 70, and also as one input of gates 72 and 74, respectively; the other input to gates 72 and 74 are $4f_{sc}$ and $\frac{1}{2}f_h$, respectively. The outputs of gates 72 and 74 are applied as the two inputs to exclusive-or gate 76, the output of which is combined with the output of gate 70 in a resistive combining network 84 to produce at output terminal 84 a signal of frequency $2f_{sc} - \frac{1}{4}f_h$. Analysis of the circuit will show that when this, the lower sideband frequency is selected, the unwanted upper sideband, as well as the fundamental frequencies, are effectively suppressed. However, considerable phase error is introduced by the presence of ($2f_{sc} + \frac{1}{4}f_h$), which is suppressed relative to ($2f_{sc} - \frac{1}{4}f_h$) by only 10dB. This undesirable component can be effectively eliminated by using a crystal oscillator 86 in a phase-locked loop 88, also including a phase detector 90, to which the output of the mixer is applied, to lock to the desired frequency and no other.

The circuit of FIG. 13 utilizes a frequency synthesizing technique to generate $f_s$, which for purposes of the following description is assumed to be ($2f_{sc} - \frac{1}{4}f_h$). Since in the NTSC system $$f_{sc} = \frac{455}{2} f_h$$

$$\text{and } 2f_{sc} - \frac{1}{4} f_h = 455 f_h - \frac{1}{4} f_h$$

$$\text{therefore } f_s = \frac{1819}{4} f_h$$

The frequency synthesizer includes a voltage-controlled oscillator 92 having a center frequency of $2f_{sc} - \frac{1}{4}f_h$ (or $1819/4f_h$). The output of the oscillator is divided down in frequency by 1819 in a frequency divider 94, resulting in a signal frequency of $\frac{1}{4}f_h$, which is compared in a phase detector 96 to a reference signal of frequency $\frac{1}{4}f_h$. Any deviation generates an error voltage, which is applied through a loop filter 98 to the oscillator to control the same.

Tests of sub-Nyquist sampling with a variety of NTSC color television signals gave promising results. Its effect on the luminance details is dependent on the angle between the picture detail and the scanning lines. Vertical luminance transitions are normally not impaired since their frequency components do not extend into the passband of the comb filter. With diagonal transitions, however, the comb filter reduces the amplitude of wanted frequency components above $f_s - f_v$ and the corresponding alias components are not completely removed. In general, however, a small deterioration of diagonal transitions does not appear subjectively objectionable. The most obvious deterioration appeared on small test circles; objectionable moire patterns resulted in this case, but that situation is rarely encountered in a broadcast program. Horizontal transitions are virtually unaffected because their energy components do not normally fall within the nulls of the comb filter.

The effect of the sub-Nyquist system on chrominance was judged imperceptible with most broadcast signals. Only highly saturated colors generate a noticeable 7.5Hz flicker at sharp vertical color transitions. This problem is particularly noticeable with 100% saturated split field color bars. Other stationary pictures including scenes from slides No. 1 to 15 of the SMPTE Television Color Reference slide set were judged not objectionably impaired.

I claim:

1. A method of digitally encoding an NTSC color television signal having a color subcarrier frequency $f_{sc}$ and a line-scan frequency $f_h$, comprising the steps of:
   generating a first sampling signal having a frequency $f_s$ that differs from $2f_{sc}$ by $\frac{1}{4}f_h$,
   sampling the television signals in response to the sampling signal, and
   converting the sampled television signal into digital form.

2. The method according to claim 1, wherein said first sampling signal has a frequency $f_s$ equal to $2f_{sc} + \frac{1}{4}f_h$.

3. The method according to claim 1, wherein said first sampling signal has a frequency $f_s$ equal to $2f_{sc} - \frac{1}{4}f_h$.

4. The method according to claim 1, including the further steps of:
   producing a second sampling signal of the same frequency and in quadrature with said first sampling signal,
   alternately enabling the first and second sampling signals during successive horizontal scan lines of the television signals, and
   sampling the television signals in response to the enabled sampling signal.

5. The method according to claim 1, including the further step of:
   comb filtering the television signals before sampling to remove therefrom any $(n + \frac{1}{2})f_h$ energy components, where $n$ is an integer.

6. Apparatus for digitally encoding an NTSC color television signal having a color subcarrier frequency $f_{sc}$ and a line-scan frequency $f_h$, comprising, in combination,
   means for generating a first sampling signal having a frequency $f_s$ differing from $2f_{sc}$ by $\frac{1}{4}f_h$,
   means for sampling the television signals in response to the sampling signal, and
   means for converting the sampled television signal into digital form.

7. Apparatus according to claim 6, further comprising:
   means for producing a second sampling signal of the same frequency and in quadrature with said first sampling signal,
   switching means responsive to the NTSC color television signal for alternately enabling said first and second signals during successive horizontal scan lines of said television signal,
   means responsive to the enabled sampling signal for sampling the television signal; and
   means for converting the sampled television signal into digital form.

8. Apparatus according to claim 6, wherein said first sampling signal has a frequency $f_s$ equal to $2f_{sc} + \frac{1}{4}f_h$.

9. Apparatus according to claim 7, wherein said first and second sampling signals have a frequency $f_s$ equal to $2f_{sc} - \frac{1}{4}f_h$.

* * * * *